Patented Aug. 20, 1946

2,405,983

UNITED STATES PATENT OFFICE 2,405,983

ADHESIVE COMPOSITION DERIVED FROM HYDROLYZED ETHYLENE-VINYL ACETATE INTERPOLYMERS

William H. Sharkey, Wilmington, Henry M. Cadot, Greenville, and William B. Clark, Wilmington, Del., assignors to E. I. du Pont de Nemours & Company, Wilmington, Del., a corporation of Delaware No Drawing. Application May 12, 1944, Serial No. 535,380

7 Claims. (Cl. 20—89)

This invention relates to a process for adhesively bonding one surface to another. It also relates to plywood, and other laminations which are united by means of an adhesive. More particularly, it relates to plywood in which the plies are united by means of an adhesive bond comprising a reaction product of an aldehyde with a hydrolyzed-ethylene-vinyl ester interpolymer.

Hitherto, plywood adhesives have contained various glue-like or resinous products, including phenol-formaldehyde and urea-formaldehyde resins. Relatively few of these adhesives were useful in manufacturing plywood having good resistance to hot water. Some of the best commercial plywood adhesives which gave bonds having good hot water resistance had other properties which were undesirable, such as instability on long storage. Moreover, when such adhesives were applied in film form in the manufacture of plywood, excessively high temperatures and pressures generally had to be used to produce a strong thermally hardened bond, and the films themselves were brittle at low temperatures, and tacky at elevated temperatures. Still another limitation of the heretofore available plywood adhesives was that they were unsatisfactory except when the moisture content of the wood was carefully controlled. Thus certain adhesives, for best results, had to be used with wood having a moisture content of 8% to 12%, while others required wood having 5% or less of moisture for best results.

An object of this invention is to provide improved plywood compositions. Another object is to obtain plywood compositions having excellent dry and wet shear strengths, even when relatively small weights of adhesive per unit of glue line area are employed. Another object is to provide a process for adhesively uniting wood surfaces at relatively low temperatures and pressures by means of a non-tacky film type adhesive, having remarkably good storage properties. A still further object is to provide a plywood adhesive which is highly effective with wood of various moisture contents. Still another object is to provide a novel method for uniting surfaces.

These and other objects are accomplished, in accordance with this invention, by (1) applying to the surface to be united a composition containing an aldehyde-reactive substance, particularly a formaldehyde-reactive substance, and a hydrolyzed ethylene-vinyl ester interpolymer, preferably in the presence of an acid-reacting catalyst, and (2) maintaining the surfaces in contact with the said composition, while subjecting them to the action of heat. The formaldehyde-reactive substances include not only formaldehyde itself, but also materials which contain formaldehyde in reactive form.

The hydrolyzed ethylene interpolymers which may be used in accordance with this invention, may be prepared, if desired, by the method described in the copending application S. N. 446,114 of J. R. Roland, filed June 6, 1942. The preferred hydrolyzed interpolymers are the interpolymers of ethylene with vinyl esters of monocarboxylic acids, especially vinyl acetate, propionate, and the like.

The compositions containing formaldehyde-reactive substances and hydrolyzed interpolymers of ethylene and vinyl esters include the resins obtained by condensation of hydrolyzed ethylene-vinyl ester interpolymers with formaldehyde and such formaldehyde-reactive substances as paraformaldehyde and the alkyl or substituted alkyl acetals; N-methylol compounds and their ethers, including dimethylol urea, N-alkoxyalkylureas, N-methylol compounds of melamine or of substituted aminotriazines and ethers thereof, N-methylol and N-alkoxymethyl amides and amines including N-methylol acetamide, N-methylol formamide, N-alkoxymethyl nylons, and N-alkoxymethyl phthalimides; uron, and methylene oxymethyl phthalimides; uron, and methylene diurea; methylol phenols including phenol-formaldehyde condensation products; cyclic formals, such as dioxolane and trioxane; hexamethylene tetramine, and its salts; and methylene glycol esters. Included also are the formaldehyde-treated hydrolyzed ethylene-vinyl ester interpolymers disclosed in copending application S. N. 447,589 of W. H. Sharkey, filed June 18, 1942, and the condensation products of hydrolyzed ethylene-vinyl ester interpolymers with N-methylol and N-alkoxymethyl compounds disclosed in application S. N. 469,460, of D. C. Pease, filed December 18, 1942.

The products which are obtained by treating formaldehyde with hydrolized ethylene-vinyl ester interpolymers in the presence of an acidic catalyst at low temperature (below about 100° C.), usually are soluble, and can be softened by heat. These products may be thermally hardened, preferably by heating to temperatures above 100° C., and the resultant resins are relatively insoluble. Generally, the latter type of formaldehyde-treated hydrolyzed interpolymer is either high-melting or fails to melt below the decomposition temperature. The preferred adhesive bonds, in accordance with this invention, contain thermally hardened formaldehyde-treated hydrolyzed interpolymer.

Among the preferred adhesives of this invention are the condensation products of formaldehyde with hydrolyzed ethylene-vinyl-acetate interpolymers. In the preparation of these products, best results are obtained when the hydrolyzed ethylene-vinyl acetate interpolymer has an intrinsic viscosity (defined by Kraemer, Ind. Eng. Chem., 38, 1201 (1938), as being the natural logarithm of the relative viscosity of a dilute solution, divided by the concentration, relative viscosity being the viscosity of the solution divided by the viscosity of the solvent) of at least 0.1, and preferably about 0.7 to 1.3. The ethylene to vinyl acetate ratio in the interpolymer prior to hydrolysis may vary very widely, but best results are obtained when this ratio is between 1.0 and 10. When this ratio is low (1.0 or lower) the products are water sensitive, and when it is high (10 or higher) the products do not yield adhesives having optimum bond strengths. Excellent results are obtained when the ratio lies between 2.0 and 5.0, and the intrinsic viscosity of the hydrolyzed interpolymer is within the preferred range noted above. When the intrinsic viscosity is low (about 0.1 to 0.5) it is preferable that the ethylene-vinyl acetate ratio be relatively high (above about 4).

It is not essential that the polymer be completely hydrolyzed, although the resin films tend to be tacky if the hydrolysis is less than about 75% complete. However, these tacky resins, when treated with formaldehyde, yield thermosetting adhesives of excellent quality. Thus, a tacky film cast from a 40% hydrolyzed ethylene-vinyl acetate polymer gave, when hardened with formaldehyde, a bond which had high wet and dry strength. Generally, and especially in the manufacture of film type adhesives, it is desirable to obtain a non-tacky hydrolyzate, and this is accomplished easily by carrying the hydrolysis nearly to completion, prior to reacting the resin with formaldehyde.

The reaction with formaldehyde is conducted preferably by mixing the hydrolyzed interpolymer with formalin in a mutual solvent, such as dioxane, methanol-chloroform mixture, dimethyl formamide or pyridine, in the presence of a small amount of organic acid catalyst at a temperature of about 60° to 80° C. Ready-to-press films, which are non-tacky and stable are obtained by evaporation of solvent from the resultant solution. These films according to this invention may be used as thermosetting interlayers in plywood manufacture, and in this manner plywood of excellent quality is obtained.

The thermosetting films of this invention are suitable for use in making either "molded" or "flat-press" plywood and also for bonding other laminating materials. A convenient temperature for hardening the adhesive of this invention in the making of plywood is about 100° to 150° C., preferably 120° to 125° C. Generally the bond, in accordance with this invention, is hardened at a pressure of about 60 to 200 pounds per square inch. Excellent results are obtained when the bond is hardened at a temperature of 120° to 125° C. and a pressure of about 75 pounds per square inch or higher. Hardening temperature as high as 200° C. or even higher may be employed when the materials to be laminated are not adversely affected by such high temperatures.

One of the surprising features of this invention is the discovery that a critical range of formaldehyde content in the formaldehyde-treated resin permits the manufacture of plywood having remarkably high shear strength. This is shown in the following table. The tests herein described were made with standard 3-ply birch plywood, having a panel thickness of ca. 0.185 inch.

Table I.—*Effect of formaldehyde content of the resin on birch plywood shear strength (ethylene-vinyl acetate ratio, 2.3; intrinsic viscosity of hydrolyzed ethylene-vinyl acetate interpolymer, 0.93; shear strengths determined according to Army - Navy Specification AN–NN–P–511b.)*

| Per cent HCHO with hydrolyzed ethylene-vinyl acetate interpolymer | Shear strength | | | |
| --- | --- | --- | --- | --- |
| | Dry | | Wet | |
| | Lbs. per square inch | Per cent wood failure | Lbs. per square inch | Per cent wood failure |
| 1.8 | 550 | 100 | 315 | 0 |
| 3.6 | 600 | 100 | 350 | 0 |
| 5.2 | 675 | 100 | 385 | 0 |
| 6.9 | 930 | 100 | 425 | 0 |
| 13.1 | 655 | 100 | 450 | 0 |
| 16.7 | 600 | 100 | 475 | 40 |
| 17.0 [1] | 1,000+ | 100 | 565 | 80 |
| 20.0 | 605 | 100 | 425 | 0 |

[1] This sample had a dry shear strength too high for determination in a standard plywood testing machine, which measures shear strength up to 1,000 pounds per square inch.

The above table shows that when the weight of HCHO is within the range of about 13 to 20% of the total resin weight, (ethylene-vinyl acetate being 2.3) plywood of outstanding quality may be prepared.

Further study of this surprising phenomenon showed that the critical range of formaldehyde content varied with the ratio of ethylene-vinyl acetate in the resin which was used as starting material. When the ethylene-vinyl acetate ratio was 5, the optimum formaldehyde content of the resin was about 10%, and the panels obtained under such conditions were of outstanding quality (dry shear strength, 960 pounds per square inch, wet shear strength 505 pounds per square inch). When the ethylene-vinyl acetate ratio was 10, the plywood had optimum strength if the HCHO content of the resin was about 2.3 to 4.0%. Higher percentage of HCHO gave panels having lower strength when the ethylene-vinyl acetate ratio was 10 or higher. These data seemed to indicate a maximum adhesive bond strength at a formaldehyde content corresponding to about 0.5 mole of HCHO per equivalent of hydroxyl in the hydrolyzed interpolymer. The outstandingly strong adhesive bonds were obtained, as shown by these data, when formaldehyde content of the adhesive corresponded to about 0.4 to 0.55 moles per equivalent of hydroxyl in the hydrolyzed interpolymer.

In the tests recorded in Table I, the weight of resin applied was about 25 pounds per 1000 square feet of area at the glue line. Since Army-Navy Specification AN–NN–P–511b for aircraft plywood requires at present a minimum shear strength of 380 pounds per square inch dry, and 290 pounds per square inch wet, it is clear that these samples were so far above minimum requirements, that a smaller weight of adhesive could safely be employed. This is shown in greater detail in the following table.

Table II.—*Effect of quantity of adhesive solids on birch plywood shear strength.* (Ethylene-vinyl acetate ratio=2.3; intrinsic viscosity of hydrolyzed ethylene-vinyl acetate interpolymer, 0.93; HCHO in resin, 15 to 20%.)

| Lbs. of solid per 1,000 square feet of area at glue line | Shear strength | | | |
|---|---|---|---|---|
| | Dry | | Wet | |
| | Lbs. per square inch | Per cent wood failure | Lbs. per square inch | Per cent wood failure |
| 28 | 850 | 100 | 460 | 0 |
| 25 | 1,000 | 100 | 500 | 30 |
| 19 | 575 | 100 | 480 | 50 |
| 14 | 950 | 100 | 405 | 25 |
| 10 | 770 | 100 | 430 | 0 |
| 8 | 720 | 75 | 380 | 0 |
| 6 | 610 | 100 | 305 | 0 |
| 4 | 720 | 20 | 200 | 0 |

The data presented in Table II show that plywood of acceptable quality may be prepared when as little as 6 pounds of resin is used for 1000 square feet of area at the glue line. This represents a significant advance in the plywood art, particularly as applied to the manufacture of aircraft plywood, since the weight of hitherto available commercial adhesives commonly employed was about 12 to 25 pounds per 1000 square feet of area at the glue line.

While it is preferred to apply the adhesives of the present invention in solid film form it is also possible to apply them in any other convenient form such as a powder, solution, dispersion or slurry. The adhesive may also be applied in the form of impregnated paper, or cloth, or sheeting comprising cloth bound to paper. The solid resin films of the present invention, however, are much stronger and much less brittle than the films of other plywood adhesives which require reinforcement by paper or cloth, and hence the resin films of this invention may be applied directly to the wood. The preferred adhesive films herein disclosed are remarkably stable, and may be stored for many months without appreciable change. They are neither tacky nor stiff over a wide range of temperature (about −10° C. to somewhat above +60° C.), and hence may be shipped or stored in the form of a roll from which the adhesive may be unwound as needed. This is of considerable convenience in the large scale production of plywood.

The invention is illustrated further by the following examples.

*Example I.*—Into a 3-necked flask equipped with a stirrer and reflux condenser were placed 60 grams of completely hydrolyzed ethylene-vinyl acetate interpolymer (ratio of ethylene:vinyl acetate, 2.3; intrinsic viscosity of hydrolyzed interpolymer, 0.93), and 240 grams of pyridine. This mixture was heated at 120° with stirring until solution was complete. It was then allowed to cool down, and 0.6 grams of maleic acid was added. To 75 grams of the resulting solution was added 6.6 grams of 37% aqueous formaldehyde solution at 60° to 80° C., and the mixture was agitated until uniform. A film was then cast from the solution on a glass plate with the aid of a doctor blade. The film which resulted upon evaporation of the solvent was flexible and non-tacky over the temperature range from about −10° C. to +60° C. A standard plywood panel, bonded at 120° to 125° C. under 200 pounds per square inch for 20 minutes with one layer of film for each glue line (25 pounds per 1000 square feet glue line), had a dry strength of more than 1000 pounds per square inch, and a wet strength of 565 pounds per square inch with 80% wood failure.

*Example II.*—To 100 grams of a pyridine solution containing 30 grams of hydrolyzed ethylene-vinyl acetate interpolymer (ratio of ethylene:vinyl acetate, 2.3:1; intrinsic viscosity of hydrolyzed interpolymer, 0.93) and 0.3 gram of maleic acid was added 5 grams of butylated urea-formaldehyde resin (60% solids), and the mixture was agitated until uniform. The warm solution was spread with a brush on each side of a standard core ply, and on the core side of two standard face plies. The plies were dried overnight. Next day the plywood was bonded at 120° to 125° C. under a pressure of 200 pounds per square inch. It had a dry strength of 870 pounds per square inch (90% wood failure) and a wet strength of 390 pounds per square inch (no wood failure).

*Example III.*—Example I was repeated using the aldehyde-reactive compounds stated in the following table, in place of aqueous formaldehyde.

Table III.—*Effect of various aldehyde-reactive agents on hydrolyzed ethylene-vinyl acetate interpolymer adhesive.* (Standard birch plywood panels, 25 pounds adhesive solids per 1000 square feet of glue line area; ethylene: vinyl acetate ratio, 2.3; intrinsic viscosity of hydrolyzed interpolymer, 0.93.)

| Aldehyde-reactive compound | Plywood shear strength, pounds per square inch | |
|---|---|---|
| | Dry | Wet |
| Phenol-formaldehyde condensation product | 715 | 390 |
| Methyl ether of dimethylol urea | 750 | 250 |
| Methyl ether of trimethylol melamine | 920 | 345 |
| Uron | 790 | 365 |
| Glyoxal | 805 | 360 |
| Methylol hexamethylene diamine | 805 | 360 |

*Example IV.*—A slurry was prepared by mixing 20 grams of powdered hydrolyzed ethylene-vinyl acetate interpolymer (ethylene:vinyl acetate= 3.3; intrinsic viscosity=0.47) with 35 grams of ethanol and 40 grams of water. To the mixture was added 5.0 grams of butylated urea-formaldehyde (60% solids), and the resulting paste was stirred until uniform. Direct application of the paste to the plies as described in Example II (25 pounds per 1000 square feet glue line), followed by bonding the plies at 145° to 150° C. under 200 pounds per square inch pressure gave a plywood panel which had a dry strength of 830 pounds per square inch, but which delaminated when placed in boiling water.

*Example V.*—A solution containing 80 grams hydrolyzed ethylene-vinyl acetate interpolymer (ethylene:vinyl acetate=2.3, intrinsic viscosity= 0.93) and 200 grams of butylated urea-formaldehyde resin in 106 grams of isobutanol and 214 grams of trichloroethylene was admixed in a mechanical disperser with 40 grams of water and 10 grams of partially hydrolyzed polyvinyl acetate (commercial grade RH-488, manufactured by the Du Pont Company). The resulting dispersion was applied to a standard birch plywood test panel as described in Example II (25 pounds of solids per 1000 square feet of glue line), and the resulting plywood, bonded at 120° to 125° under 200 pounds per square inch pressure for 20 minutes, had a dry strength of 995 pounds per square inch (60 wood failure) and a wet strength of 300 pounds per square inch (no wood failure).

*Example VI.*—To determine the effect of moisture content of the veneer prior to bonding on the adhesive bond strength, Example I was repeated using woods of controlled moisture content. The following table shows that bond strength was not very sensitive to the moisture content of the wood over the range of about 0 to 15%.

*Table IV.—Effect of moisture content of wood on adhesive bond strength (Standard plywood panels, 14 pounds adhesive solids per 100 square feet of glue line area; ethylene-vinyl acetate ratio, 2.3; intrinsic viscosity of hydrolyzed interpolymer, 0.93).*

| Moisture content of the wood, per cent | Plywood shear strength, pounds per square inch | |
|---|---|---|
| | Dry | Wet |
| 0 | 890 (100% wood failure) | 560 (10% wood failure) |
| 8.9 | 920 (100% wood failure) | 645 (50% wood failure) |
| 15.2 | 720 (100% wood failure) | 500 (50% wood failure) |

It will be understood that the present invention has wide application in the adhesive field, and is not limited to use in manufacture of plywood. Paper, cloth or wood, which if desired, may be impregnated with resinous materials, can be bonded satisfactorily by use of the herein disclosed adhesives.

The above examples show the use of a carboxylic acid catalyst. Satisfactory results are also obtained when other suitable catalyst are employed. If the wood contains a sufficient quantity of acidic constituents, whether naturally present or not, no additional catalyst is essential. The catalyst may be derived from a substance which generates acid on heating. It is advantageous to have the pH of the adhesive within the range of about 4 to 6 during the thermosetting operation, and this may be achieved by the use of conventional buffers, if desired. However, adhesives of the present invention have good storage properties even without buffering the catalysts. Numerous salts, including metal halides, acidic salts, and the like, may be employed as catalysts if desired. Extenders, such as wood flour may be employed with the adhesive composition, without excessive loss of dry bond strength.

Since many apparently widely different embodiments of this invention may be made without departing from the spirit and scope thereof, we do not limit ourselves, except as set forth in the following claims.

We claim:

1. Plywood adhesively bonded by an adhesive comprising a carboxylic acid catalyst and a condensation product of formaldehyde with a hydrolyzed ethylene-vinyl acetate interpolymer.

2. An article comprising two cooperating members adhesively united with a condensation product of a hydrolyzed interpolymer of ethylene and a vinyl ester of an organic mono-basic carboxylic acid and formaldehyde.

3. A solid film formed by condensing hydrolyzed ethylene-vinyl acetate interpolymer with formaldehyde, the quantity of formaldehyde being about 0.4 to 0.55 mole per equivalent of hydroxyl in the hydrolyzed interpolymer, said film containing an acid-reacting catalyst and being characterized in that it is non-tacky stable on prolonged storage, and thermally reactive when used as a plywood adhesive interlayer.

4. The article set forth in claim 1 in which the said acid catalyst is maleic acid.

5. The article set forth in claim 1 in which the said interpolymer has an ethylene:vinyl acetate mole ratio of from 1:1 to 10:1.

6. The article set forth in claim 1 in which the formaldehyde content of the adhesive is 0.4 to 0.55 mole per equivalent of hydroxyl in the hydrolyzed interpolymer.

7. The article set forth in claim 1 in which the said interpolymer has an ethylene:vinyl acetate mole ratio of from 2.0 to 5.0 and an intrinsic viscosity of about 0.7 to 1.3.

WILLIAM H. SHARKEY.
HENRY M. CADOT.
WILLIAM B. CLARK.